United States Patent
Poslowski et al.

(10) Patent No.: US 9,440,669 B2
(45) Date of Patent: Sep. 13, 2016

(54) STROLLER

(71) Applicant: Foundations Worldwide, Inc., Medina, OH (US)

(72) Inventors: Lukasz S. Poslowski, Middleburg Heights, OH (US); Joseph A. Lawlor, Medina, OH (US); David Stitchick, Norton, OH (US)

(73) Assignee: FOUNDATIONS WORLDWIDE, INC., Medina, OH (US)

( * ) Notice: Subject to any disclaimer, the term of this patent is extended or adjusted under 35 U.S.C. 154(b) by 0 days.

(21) Appl. No.: 14/450,961

(22) Filed: Aug. 4, 2014

(65) Prior Publication Data

US 2016/0031470 A1    Feb. 4, 2016

(51) Int. Cl.
| | | |
|---|---|---|
| *B62B 7/14* | (2006.01) | |
| *B62B 9/10* | (2006.01) | |
| *B62B 7/00* | (2006.01) | |
| *B62B 7/04* | (2006.01) | |
| *B62B 9/12* | (2006.01) | |

(52) U.S. Cl.
CPC .............. *B62B 7/008* (2013.01); *B62B 7/006* (2013.01); *B62B 7/04* (2013.01); *B62B 9/12* (2013.01)

(58) Field of Classification Search
CPC ....... B62B 7/142; B62B 7/145; B62B 7/008; B62B 9/102
See application file for complete search history.

(56) References Cited

U.S. PATENT DOCUMENTS

| | | | | |
|---|---|---|---|---|
| 5,033,761 A | * | 7/1991 | Kelly | B62B 7/04 280/47.38 |
| 7,448,476 B2 | * | 11/2008 | Otterson | B62B 5/04 188/19 |
| 2010/0038887 A1 | * | 2/2010 | Bar-Lev | B62B 7/12 280/658 |

OTHER PUBLICATIONS

Foundations, "Sport Strollers", retrieved from "https://web.archive.org/web/20130424050206/http://www.foundations.com/sport-strollers.html", Apr. 24, 2013.
Foundations, "Gaggle Buggy", retrieved from https://web.archive.org/web/20130528204410/http://www.foundations.com/gaggle-buggy.html, May 28, 2013.

* cited by examiner

*Primary Examiner* — Bryan Evans
(74) *Attorney, Agent, or Firm* — Walker & Jocke

(57) ABSTRACT

A stroller assembly is provided that includes a frame. The stroller assembly may also include a plurality of wheel assemblies that are operable to mount to the frame. In addition, the stroller assembly may include a front seat module and a back seat module comprised of a plastic material. The front seat module and the back seat module may include integral fastener members that are operative to engage with each other when the front seat module and the back seat module are mounted to the frame.

29 Claims, 11 Drawing Sheets

STROLLER

BACKGROUND

Strollers are apparatuses that are used to manually transport children. Strollers may include one or more seats in which children are seated. Such seats may include child restraints such as seat belt straps and buckles to secure each child to a respective seat of the stroller. Strollers may also include a handle for use by a caregiver to push and pull the stroller. Strollers may benefit from improvements.

SUMMARY

The following is a brief summary of subject matter that is described in greater detail herein. This summary is not intended to be limiting as to the scope of the claims.

In one example embodiment of one or more inventions described herein, a stroller assembly may include a frame. The stroller assembly may also include a plurality of wheel assemblies that are operable to mount to the frame. In addition, the stroller assembly may include a front seat module and a back seat module comprised of a plastic material. The front seat module and the back seat module may include integral fastener members that are operative to engage with each other when the front seat module and the back seat module are mounted to the frame. In addition, each one of the front seat module and the back seat module includes two seats in side-by-side relation. Also, the front seat module, the back seat module, and the respective integral fastener members are comprised of a plastic material.

In an example embodiment, these elements of the stroller are operative to fit/nest together (in a fully or partially disassembled form) inside a single shipping box that is sufficiently small to be shipped via ground by common commercial package carriers such as United Parcel Service or Federal Express.

To form a rigid stroller that is operative to minimize the opportunity for a child to be injured, the described integral fastener members may include a projection that serves as a floor between the back seat module and the front seat module. For example, in a first embodiment, the integral fastener member of the back seat module may include the described projection, which extends forwardly from the back seat module (i.e., the projection extends in the direction in which the seats of the back seat module face). This described projection is operative to engage with the fastener member of the front seat module. The projection may include an upper floor surface that is positioned below the seats of the back seat module, such that the projection is operative to support the feet of children sitting in the seats of the back seat module or standing between the back seat module and the front seat module.

In an alternative embodiment, the integral fastener member of the front seat module may include this described projection, which extends rearward from the front seat module (i.e., the projection extends in the opposite direction in which the seats of the front seat module face). In this alternative example, this described projection is operative to engage with the fastener member of the back seat module. When engaged with the fastener member of the back seat module, the projection includes an upper floor surface that is positioned below the seats of the back seat module such that the projection is operative to support the feet of children sitting in the seats of the back seat module or standing between the at least back seat module and the front seat module.

In either of these two described embodiments, the engagement of the projection with the adjacent seat module in combination with the mounting of each seat module to the described frame is operative to form a rigid structure capable of supporting the weight of four (or more) children. In an example embodiment, the fastener members may include interlocking features. For example, the described fastener members may correspond to respective tongue and groove configurations that enable the projection to interlock in a groove/slot of the adjacent seat module. Also, it should be appreciated that in alternative embodiments, the described fastener members may have other configurations that enable the seat modules to engage with each other when mounted to the frame.

In example embodiments, the seats of the seat modules may include child restraints such as straps and buckles operative to form a harness that securely holds each child to a seat. In addition, the stroller may include a push handle that is configured to fasten to the back seat module, the frame, at least one of the wheel assemblies, or a combination thereof. Also, some embodiments of the described stroller assembly may include a roof assembly that is configured to fasten to the front seat module, the back seat module, the frame, at least one of the wheel assemblies, or a combination thereof. Such a roof assembly may, for example, extend over both the front seat module and the back seat module in order to at least partially provide shade from sunlight and/or shelter from rain drops or snow.

The described stroller assembly may have features that accept the mounting of additional seat modules to the stroller so as to accommodate transporting additional children. For example, in a further embodiment, a second shipping box may be provided. The second shipping box may include a middle seat module comprised of the plastic material (which may be similar in shape to the back seat module). Such a middle seat module may be adapted to mount between the front seat module and the back seat module. Also, the second shipping box may include a frame extension that is operative to mount to the frame so as to provide additional length to the frame to mount the middle seat module.

In this described embodiment, the middle seat module may include an integral fastener (which may be similar to the previously described projection of the back seat module) that is operative to engage with the fastener member (e.g., the slot) in the rearward portion of the front seat module. Also, the middle seat module may include a second integral fastener on its rearward side (which may be similar to the previously described slot of the front seat module) that is operative to engage with the projection of the back seat module. However, it should be appreciated that in alternative embodiments, other configurations of fastener members may be used (e.g., the locations of the described projections and slots may be reversed).

Other aspects will be appreciated upon reading and understanding the attached figures and description.

DETAILED DESCRIPTION

Figure 1:
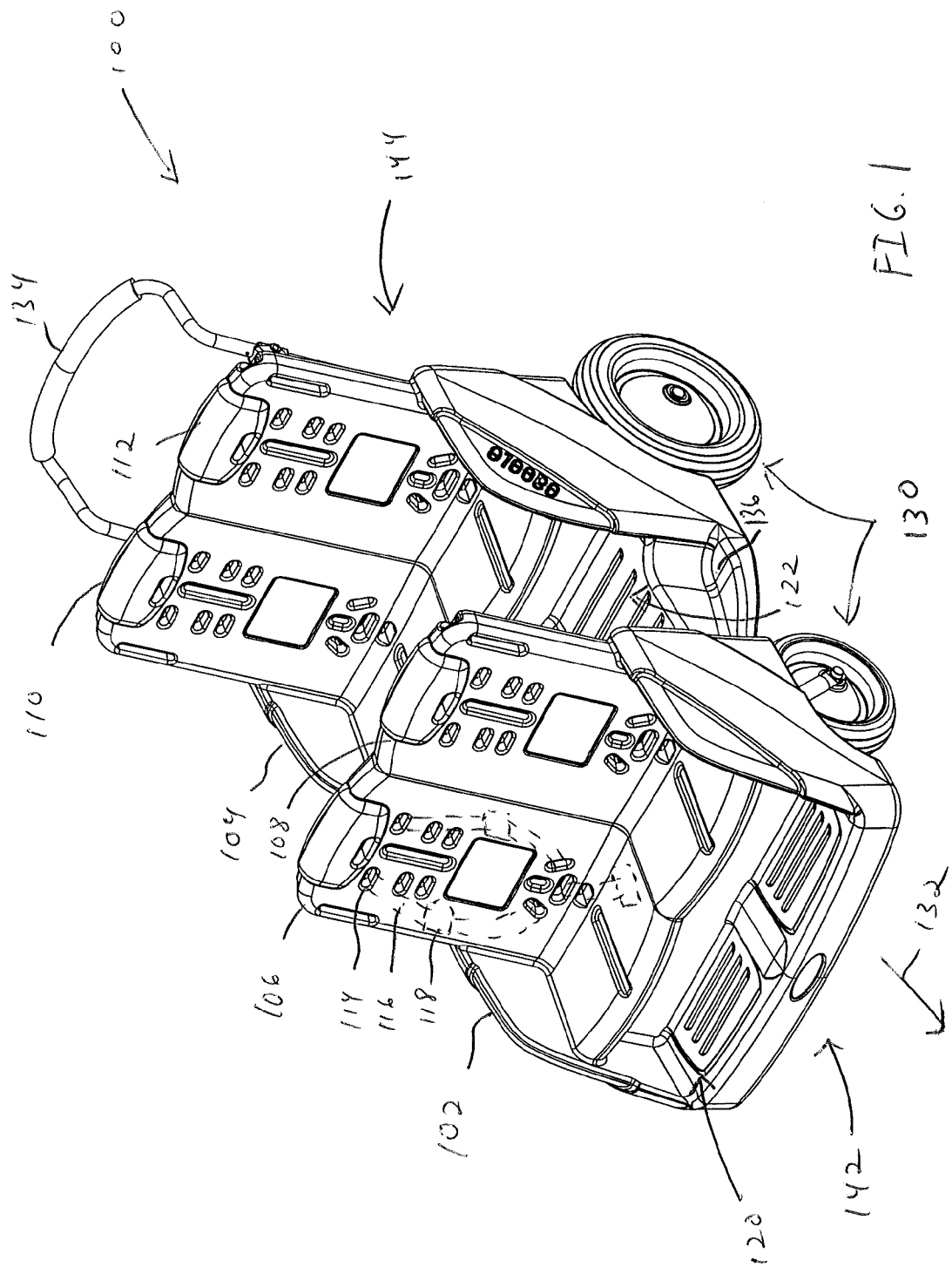
FIG. 1 is an isometric view of an example stroller assembly that facilitates manually transporting children.

Various technologies pertaining to strollers will now be described with reference to the drawings, where like reference numerals represent like elements throughout. Also, it is to be understood that functionality that is described as being carried out by certain system components may be performed by multiple components. Similarly, for instance, a component may be configured to perform functionality that is described as being carried out by multiple components.

With reference to FIG. 1, an example stroller assembly 100 that facilitates manually transporting several children is illustrated. The assembly 100 may include at least two seat modules such as a front seat module 102 and a back seat module 104. These seat modules may be mounted to a frame that includes a plurality of wheel assemblies 130.

Each seat module may include two seats 106, 108, 110, 112 in side-by-side relation such that two children may sit beside each other in a seat module. In addition, each seat may include a plurality of holes 114 which receive straps 116 that include buckles 118 or other fasteners thereon. Such holes 114, straps 116, and buckles 118 correspond to a safety restraint system that is operative to prevent a child from falling out of the stroller.

As shown in FIG. 1, this example stroller may also include foot support surfaces/floors 120, 122 positioned below the seats of each seat module 102, 104. Such floor surfaces may serve as foot rests when a child is seated in a seat. In addition, such floor surfaces are also operative to support a child in a standing position. Thus, a child that is capable of walking may step onto the floor surfaces 120, 122 when climbing into or climbing out of the stroller.

In addition, it should be noted that a stroller is typically pushed from behind by a caregiver and the seats are oriented to face in the forward direction 132 in which the stroller is pushed from behind. Thus, in this arrangement, the described stroller includes a front end 142 towards which the seats face, and includes a rear end 144 from which a cart is pushed. To assist the caregiver in pushing, pulling, and turning the stroller, the stroller may include a handle 134 mounted to the rear end 144 of the stroller.

Figure 2:
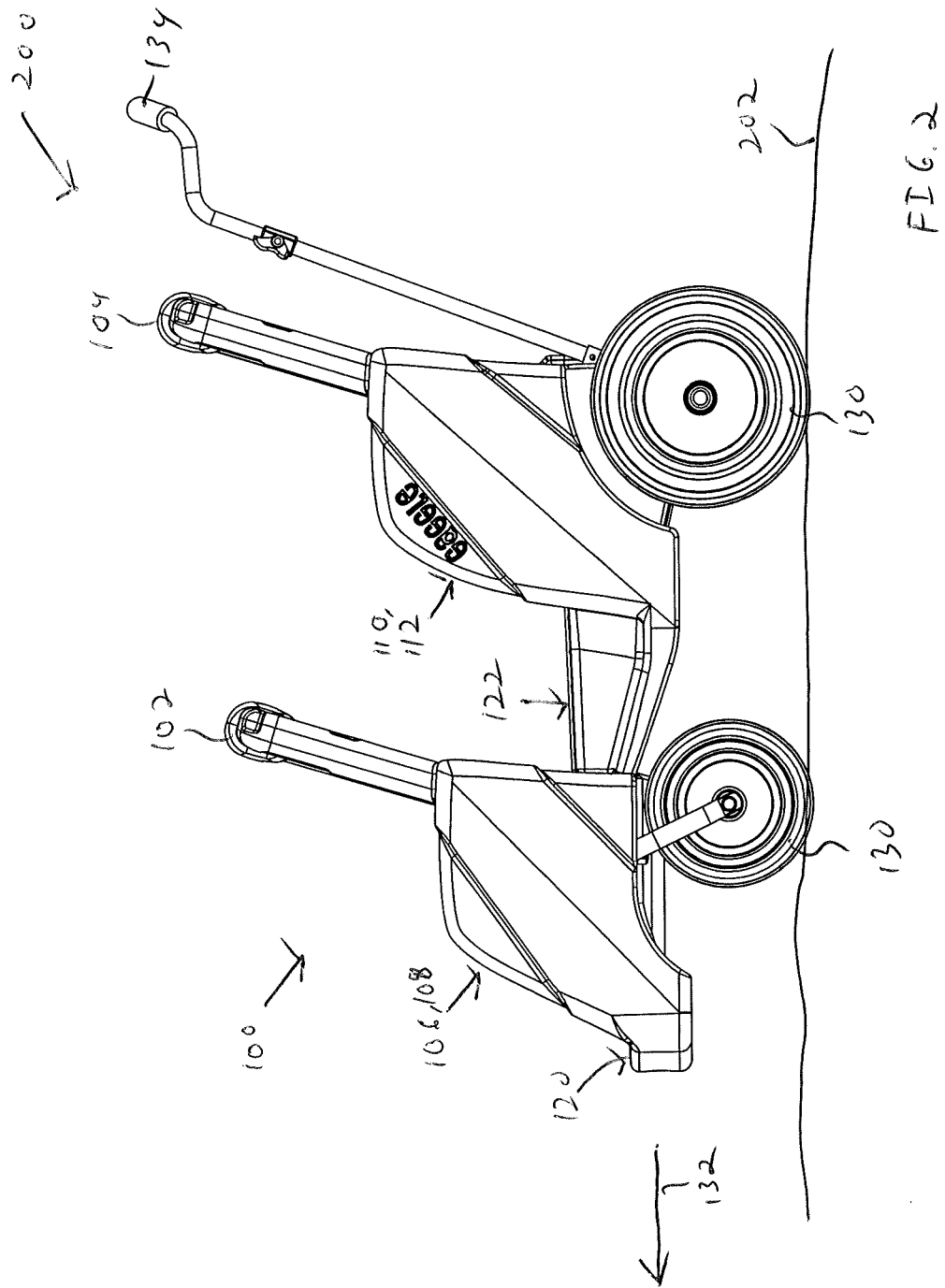
FIG. 2 is a side plan view of the example stroller assembly.

Referring now to FIG. 2, there is shown a side view 200 of the stroller 100. In this example, the back seat module 104 may extend vertically higher than the front seat module 102 relative to a horizontal ground surface 202 on which the wheel assemblies are supported. Thus, the floor surface 122 and seats 110, 112 of the back seat module 104 may be positioned relatively higher (relative to the ground 202) than the corresponding floor surface 120 and seats 106, 108 of the front seat module 102. It should be appreciated that such a configuration provides a stadium seating style arrangement for the seats of the stroller to enable children in the back seat module to have improved visibility in the forward facing direction 132.

Referring back to FIG. 1, an example configuration of the back seat module 104 may include side steps 136 mounted on each side of the seat module. Such side steps 136 may include upper surfaces that are relatively lower than the floor surface 122 of the back seat module 104. Such side steps may be used to assist a child with climbing into the higher seats of the back seat module.

Figure 3:
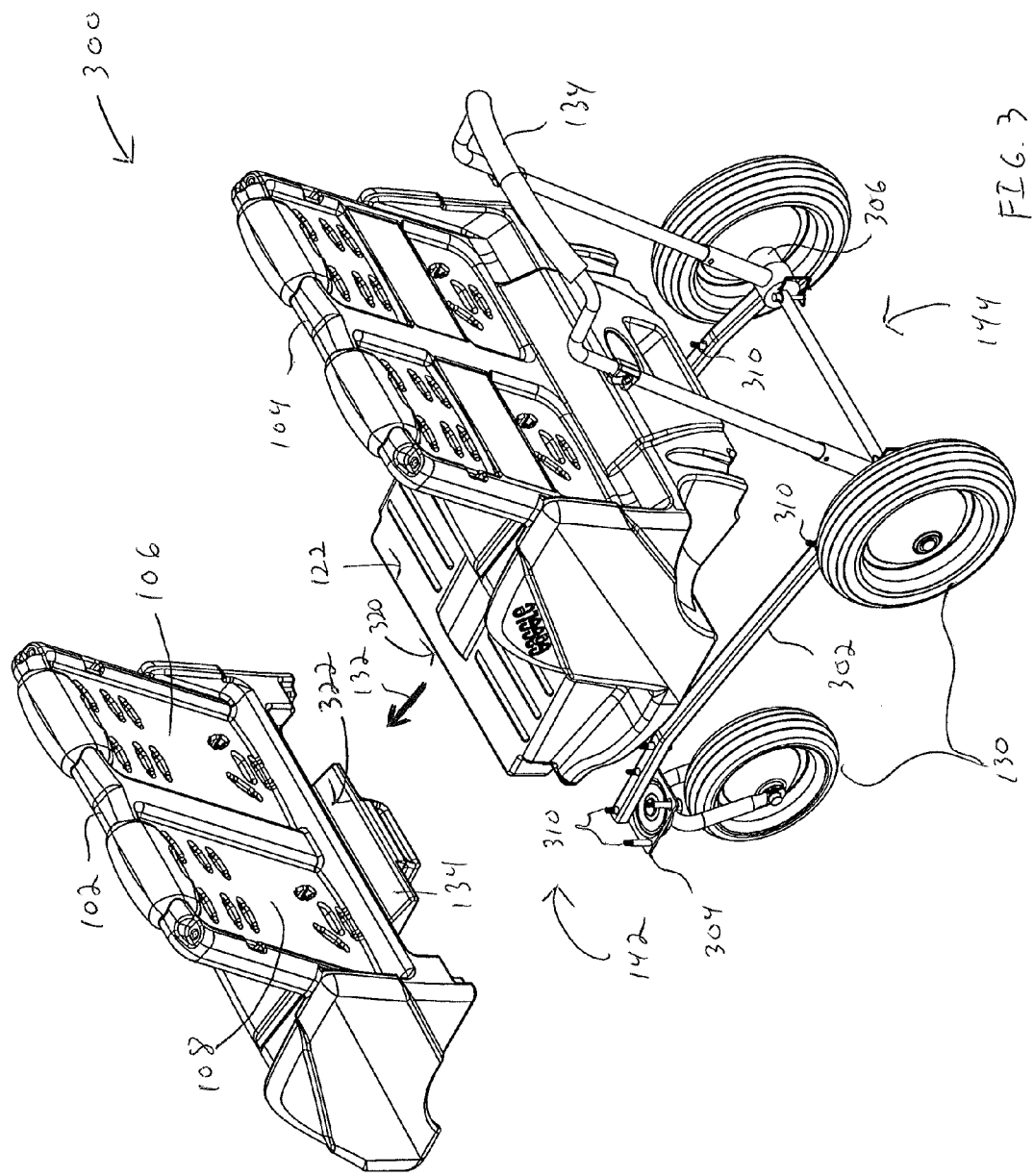
FIG. 3 is an exploded view of the example stroller assembly.

As discussed previously, the described example embodiment of the stroller assembly 100 may include a frame to which the seat modules 102, 104 are mounted. FIG. 3 shows an exploded view of the stroller assembly that depicts an example configuration for such a frame 302. In this example, the frame may accommodate the direct mounting to the frame of both seat modules 102, 104 and the plurality of wheel assemblies 130. Such wheel assemblies, for example, may include pivotable wheel casters 304 mounted to the frame 302 via fasteners such as bolts. As shown in FIG. 2, the wheel casters 304 may be mounted to a portion of the frame 302 that is positioned towards the front end 142 of the stroller.

Also, in this described embodiment, the wheel assemblies may include non-pivoting wheel assemblies 306 mounted to the portion of the frame 302 that is positioned towards the rear end 144 of the stroller assembly. For example, such rearward mounted wheel assemblies may have a shaft/axle that is mounted to the frame such that the wheel assembly does not pivot from side to side. Also, such rearward mounted wheel assemblies (and/or the frame to which they are mounted) may be controlled via a brake system that when engaged is operative to prevent the wheels of the wheel assemblies from rotating.

As used herein, a wheel assembly corresponds to the various elements that enable a wheel to rotate and be connected to the stroller. Thus, a wheel assembly may include elements such as a wheel, tread, rim, hub, shaft, bearings, and mounting hardware. Also, it should be appreciated that alternative embodiments of the stroller may have different arrangements of wheel assemblies than shown in FIG. 3. For example, alternative embodiments may include less or more wheel assemblies and/or different types of wheel assemblies. Also, in example embodiments, rather than being mounted only to the frame, one or more of the wheel assemblies may be mounted directly to both the frame and a seat module. Also, in alternative embodiments, the wheel assemblies may be mounted to a seat module and not to the frame.

In addition, as shown in FIG. 3, the handle 134 may include tubular bars that are mounted to the frame 302 adjacent to the rear wheel assemblies. However, in alternative embodiments, it should be appreciated that the handle 134 may be mounted directly to the back seat module 104 and/or may be mounted to both the frame and the back seat module.

Figure 4:
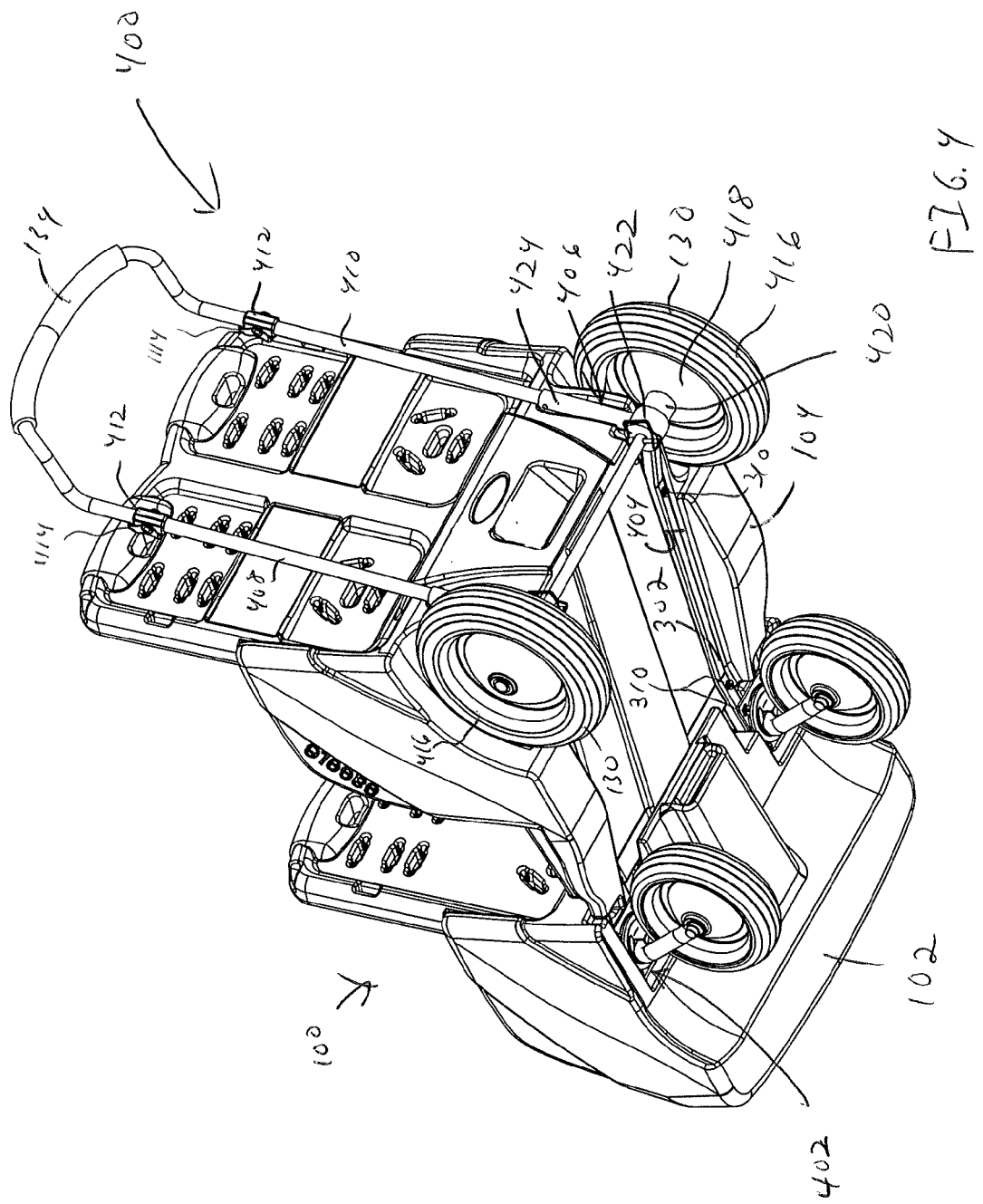
FIG. 4 is a bottom isometric view of the example stroller assembly.

Referring now to FIG. 4, there is shown the bottom view 400 of the stroller assembly 100 with the seat modules 102, 104 mounted to the frame 302. In this example, the bottom surfaces of each of the seat modules may include recesses and/or channels 402, 404, 406 that receive portions of the frame 302. As shown in both FIGS. 3 and 4, a plurality of spaced apart fasteners 310, such as bolts, may be positioned to extend from the frame (and the front wheel assemblies) into engagement with the seat modules in order to rigidly mount the seat modules to the frame.

In example embodiments, the frame may be comprised of metal tubes and/or rods made of steel, aluminum, or other metals. However, it should be appreciated that in alternative embodiments, other types of materials may be used to construct the frame (e.g., carbon composites).

In addition, in this described embodiment, the seat modules are comprised of a molded plastic material that is operative to both support a seated and standing child and provide rigidity to the stroller when mounted to the frame. In an example embodiment, the seat modules may be comprised of a plastic material such as polyethylene or polypropylene. Also, alternative embodiments may be comprised of other types of plastic materials such as PVC and ABS. In addition, such seat modules may be formed via a blow molding process or any other suitable method for molding plastic material into the described seat modules.

In example embodiments, the rigidity of the assembled stroller may be further enhanced by the manner in which the seat modules are constructed. For example, both the front seat module and the back seat module include integral fastener members that enable these seat modules to engage with each other in a manner that enhances the rigidity of the stroller.

Referring back to FIG. 3, the back seat module 104 may include an integral fastener member in the form of a projection 320 that extends in the forward facing direction 132 towards the front seat module 102. This projection may include the previously described floor surface 122 thereon. In addition, the front seat module 102 may include an integral fastener member in the form of a slot 322 positioned between the portions of the seat module that form the seats 106, 108 and an angled lower wall/ramp 324.

It should be noted that the word "integral" in this context means that the described projection and or walls that bound the described slot for these described fastener members are formed as one piece with the body of the corresponding seat modules. Thus, when the seat modules are formed (e.g., via blow molding), the mold forms the seats as well as these described fastener members out of the same continuous plastic material. In addition, an integrally formed fastener member, such as the projection, may correspond to an initially separate projection member comprised of a plastic material that is fastened to the seat module to form a one piece construction via heat welding, solvent welding, or other method of integrally bonding the components together.

Figure 5:
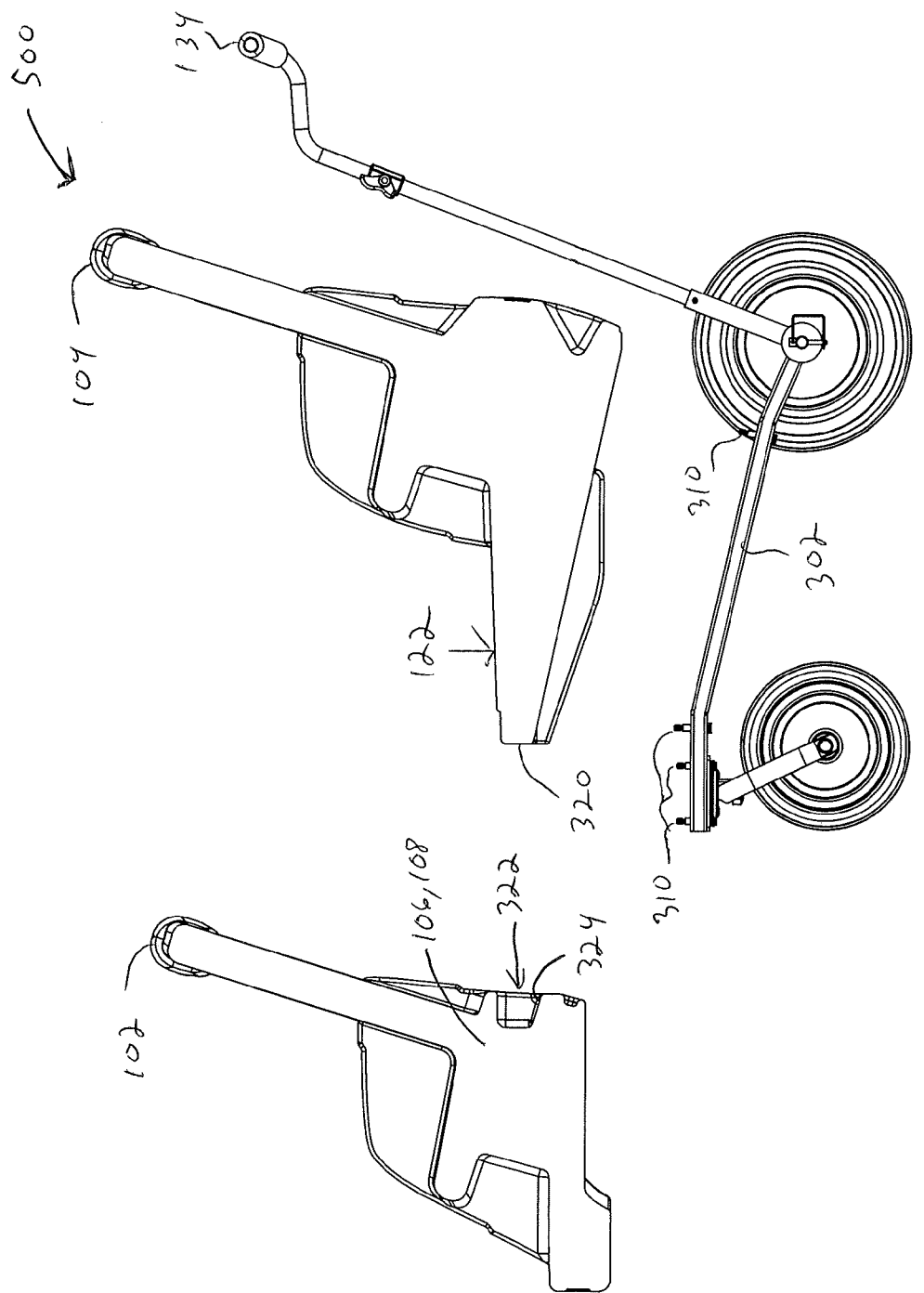
FIG. 5 is a cross-sectional view of the seat modules of the example stroller assembly.

To illustrate these fastener members more clearly, FIG. 5 shows a cross-sectional view 500 of the front seat module 102 and the back seat module 104 prior to being engaged together. Such a projection 320 and slot/ramp elements 322, 324 may correspond to a tongue and groove fastening arrangement. Such a tongue and groove fastening arrangement enables the back seat module and the front seat module to engage with each other in an interlocking manner that enhances the rigidity of the overall stroller when the seat modules are mounted to the frame.

However, it should be appreciated that in alternative embodiments the seat modules may have other forms of fastener members that enable the seat modules to engage with each other. For example, alternative embodiments may have fastener members on the seat modules that are operative to form a dovetail joint. Also, in other embodiments, the previously described fastener members may be reversed, such that the back seat module includes the slot and the front seat module includes the previously described projection which extends rearward from the back of the front seat module and extends into engagement with the slot of the back seat module. In this alternative embodiment, the projection extending from the front seat module forms the previously described floor surface below the seats of the back seat module.

The previously described stroller assembly has been described as including two seat modules that each include two seats in side-by-side relation. Thus, the described stroller assembly is operative to enable four children to sit in the stroller in separate seats. However, it should also be appreciated that in alternative embodiments, the seat modules may include more or less seats. For example, the front seat module may have only a single seat, whereas the back seat module may continue to include two seats. Also, in a further embodiment the front seat module and/or the back seat module may include three or more seats in side-by-side relation.

Figure 6:
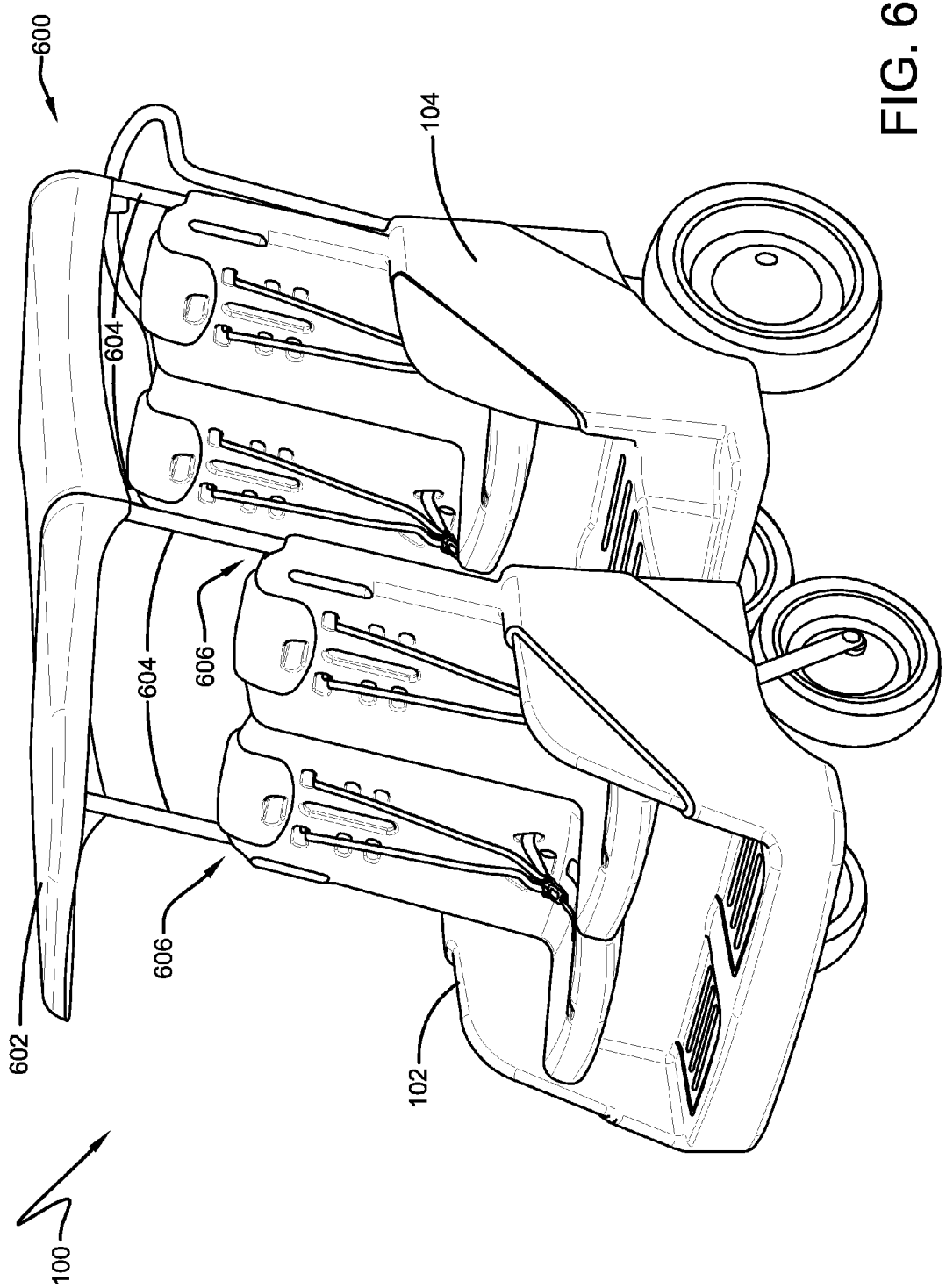
FIG. 6 is an isometric view of an example stroller assembly which includes an optional roof.

In addition, in a further configuration, the described stroller assembly may be adapted to include additional elements. For example, FIG. 6 shows a further example 600 of the stroller assembly 100 that includes an optional roof 602. Such a roof may be mounted to the stroller assembly to provide the children sitting in the seat modules with some protection against sun, rain, and/or snow. In the example shown in FIG. 6 the roof includes four supports 604 that extend through channels 606 in the sides of the seats of the front seat 102 module and the back seat module 104. However, it should be appreciated that in alternative embodiments the roof may be mounted to other and/or additional portions of the stroller assembly such as the frame and handle of the stroller assembly.

Figure 7:
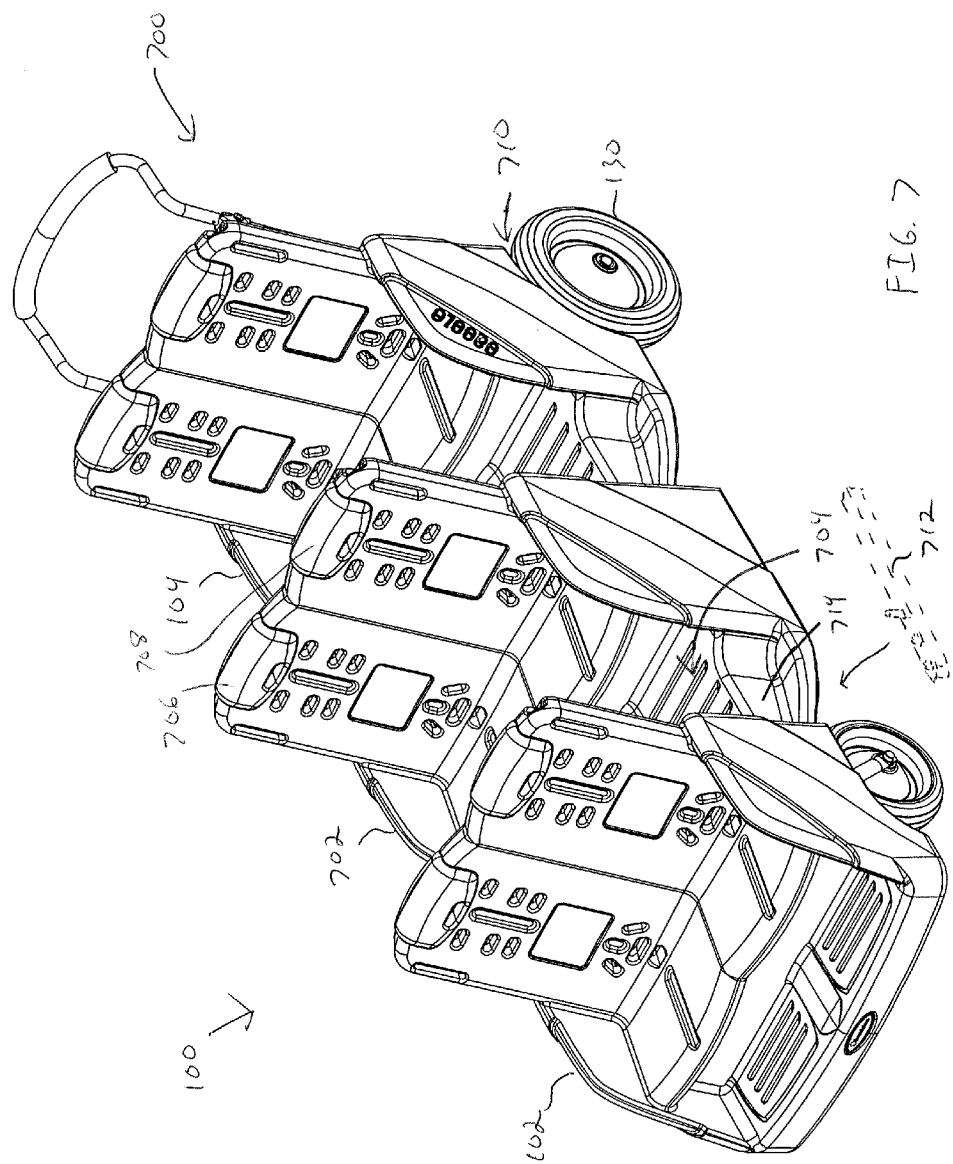
FIG. 7 is a schematic view of an alternative arrangement of the example stroller assembly which includes an additional back seat module.

In addition, the described stroller assembly may be adapted to include additional seat modules. FIG. 7 shows an example of the stroller assembly 100 in which a middle seat module 702 has been mounted in-between the front seat module 102 and the back seat module 104. To enhance the stiffness and rigidity of the stroller assembly, the middle seat module may include two integral fastener members so as to be operative to engage with both the front seat module and the back seat module when the middle seat module is mounted to the frame of the stroller.

To accommodate the additional length of the stroller assembly, the previously described frame may be lengthened with the addition of frame extension(s) 712 that extend the length of the frame between the front and rear wheel assemblies of the stroller. Such a frame extension, for example, may correspond to additional tubular members that mount to the front of the existing frame and that accept the front wheel assemblies mounted thereto.

In this described example, the middle seat module 702 may have a structure that is similar to the structure of the back seat module 104. For example, the middle seat module may include an integral projection 714. Such a projection may have a shape that corresponds to the shape of the projection 320 of the back seat module 104 shown in FIG. 3. Like the projection 320 of the back seat module, the projection of the middle seat module is operative to extend in the slot 322 of the front seat module 102. Also, like the projection 320 of the back seat module, the projection 714 of the middle seat module 702 may include a floor surface 704 beneath the seats 706, 708 of the middle seat module.

In addition, the middle seat module may include a slot mounted rearward on the middle seat module (not shown in FIG. 7). Such a slot may have a shape that corresponds to the shape of the slot 322 of the front seat module 104 shown in FIG. 3. Like the slot 322 of the front seat module, the slot of the middle seat module is operative to receive the projection 320 of the back seat module 104.

However, it should be appreciated that such a middle seat module may have a different configuration to correspond to alternative configurations of the fastener members of the front and back seat modules. For example, in an alternative embodiment, the projection and the slot of the middle seat module may be reversed, such that the projection extends rearward from the back of the middle seat module, and likewise the slot is positioned on the front of the middle seat module.

As shown in FIG. 7, the middle seat module 702 has a shape that is similar but not identical to the back seat module 104. For example, the back seat module may not include a rearward slot that is operative to receive a projection. Also, the back seat module may include rear wheel wells 710 to accommodate wheel assemblies 130 mounted thereunder, whereas the middle seat module may not include wheel wells. However, it should be appreciated that in an alternative embodiment, the middle and back seat modules may have all of these described features (and may optionally be identical). Thus, the middle seat module and the back seat module could be swapped and the stroller could still be assembled in the same manner shown in FIG. 7. It should also be appreciated that such a stroller assembly could accommodate additional middle/back seat modules so as to produce a stroller assembly with four or more seat modules (provided that the frame is elongated with additional frame extensions and optionally additional wheel assemblies).

Figure 8:
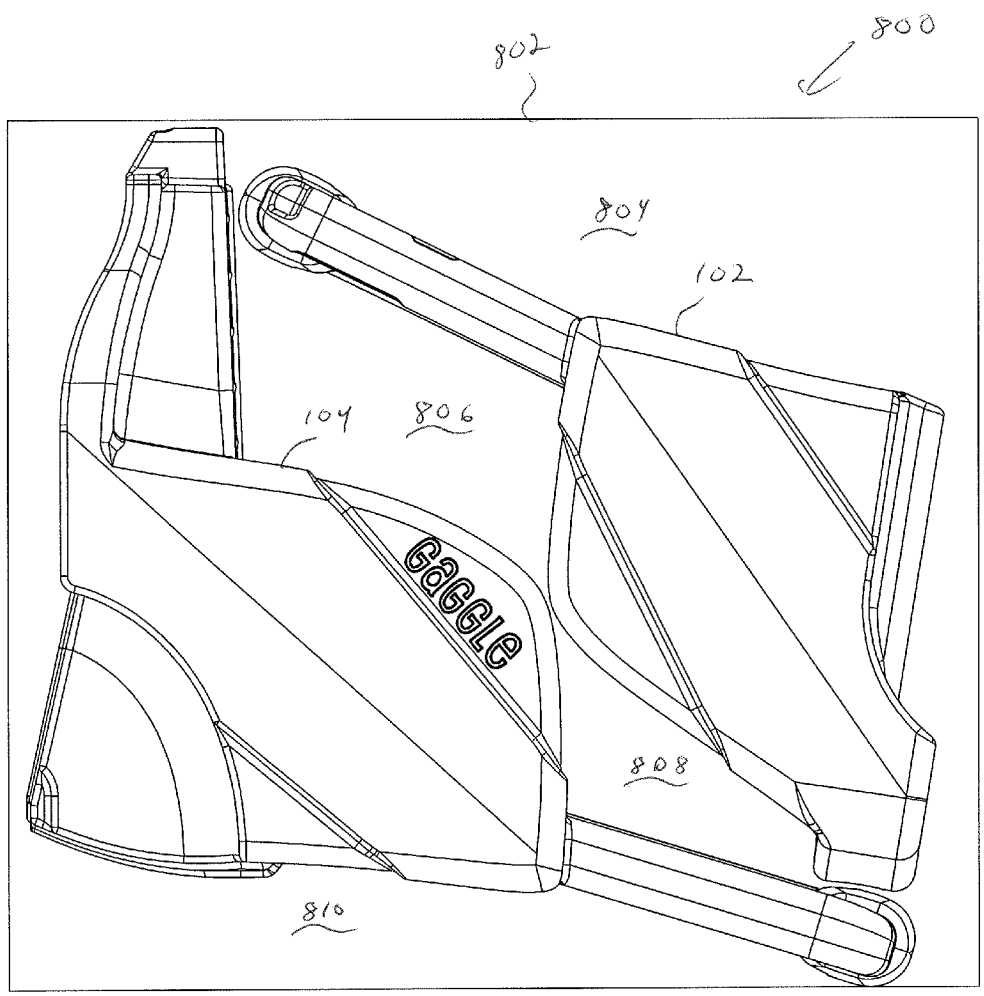
FIG. 8 is a cross-sectional view of the seat modules nested in a box.

In an exemplary embodiment, the previously described fastener members of the front seat module 102 and back seat module 104 enable these seat modules to be shipped disengaged from each other in a configuration that can fit/nest in a single generally rectangular shipping box along with the previously described frame, wheel assemblies and handle. FIG. 8 illustrates an example 800 in which the front seat module 102 and the back seat module 104 have been nested together to fit inside a shipping box 802. Also, it should be noted that the additional spaces in the box 804, 806, 808, 810, for example, may be used to place packing material and other components of the described stroller assembly, such as the frame and wheel assemblies.

In an example embodiment, such a shipping box has a size that would qualify for ground shipment via a carrier such as Federal Express and United Parcel Service. For example, such a shipping box may have dimensions that are classified as a Federal Express oversize 3 (OS3) shipment. Such an OS3 compliant box may have a length and girth that added together are equal to or less than 165 inches. Length (L) in this context corresponds to the larger dimension of the length, height, and width of the rectangular box 802. Also, girth in this example corresponds to 2×height (H)+2×width (W) of the box 802. When removed from outside the box, these elements are operative to be assembled together into a stroller that accommodates four children seated in the seats of the front seat module and the back seat module.

If an end user of the stroller (such as a daycare center) desires a stroller that can seat more than four children, this described shipping box may be sent to the customer along with a second shipping box of the same size or smaller that includes the previously described extension frame and a middle seat module. Thus, the described stroller assembly enables a four seat capacity stroller to be shipped via a ground shipping service in a single box along with a second box that is shipped via ground shipping service that includes the necessary elements to adapt the stroller assembly to seat six children.

With reference now to FIG. 8, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Figure 9:
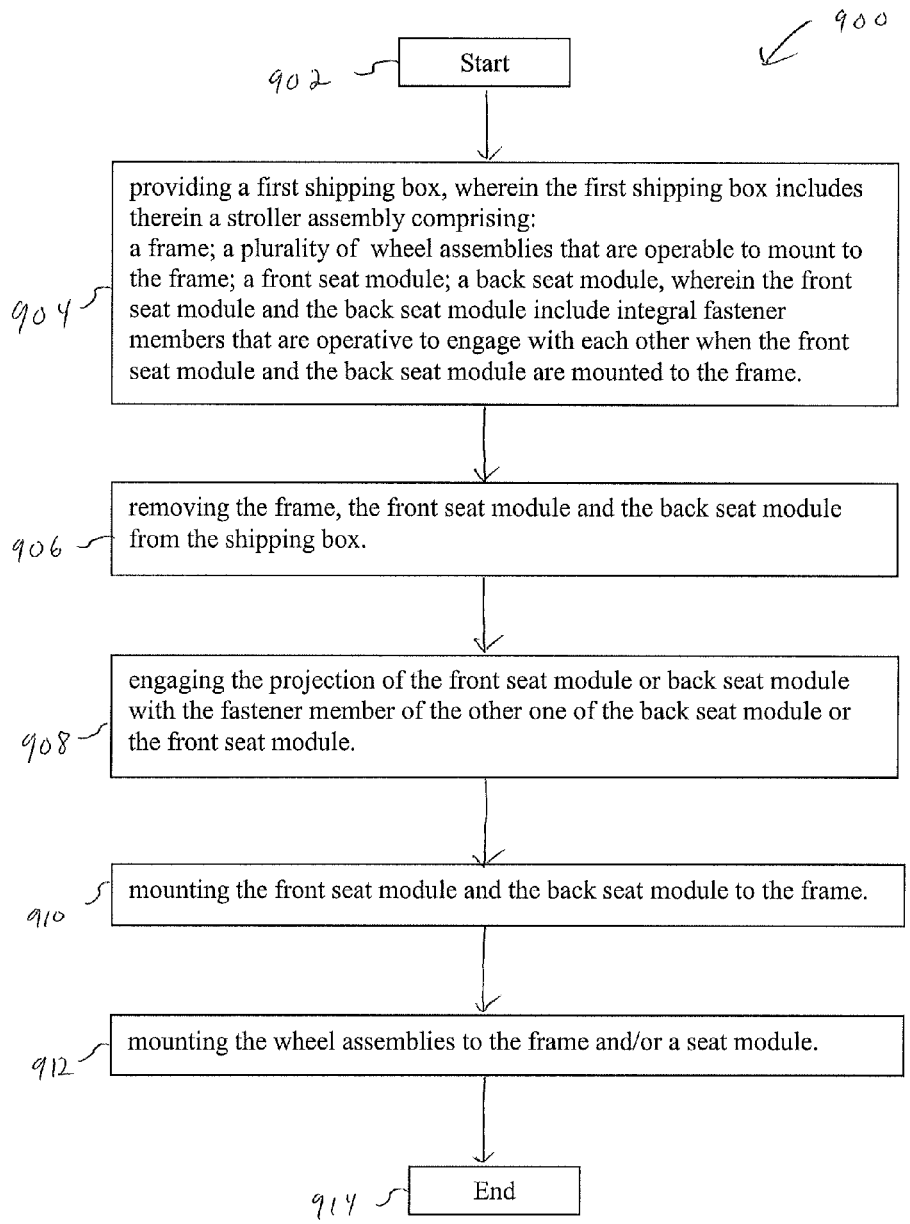
FIG. 9 is an example methodology for providing the example stroller assembly.

Referring now to FIG. 9, a methodology 900 that facilitates providing such a stroller assembly is illustrated. The methodology 900 begins at 902, and at 904 includes a step of providing a first shipping box. As described previously, such a first shipping box may include: a frame; a plurality of wheel assemblies that are operable to mount to the frame; a front seat module; and a back seat module. In this example, the providing step may include the act of shipping the described first shipping box to a customer. This providing step may alternatively, or in addition, include the end user simply acquiring for use this described first shipping box that includes these described elements therein.

After this described box has been provided to an end user, this described method may include a step 906 in which the end user may remove the frame, the front seat module, the back seat module, the wheel assemblies, and the handle from the shipping box (either at one time or at different times as each element is needed). In addition, the method may include a step of 908 of engaging the fastener member (e.g., the projection) of the front seat module or back seat module with the fastener member (e.g., the slot) of the other one of the back seat module or the front seat module. Also, the method may include a step 910 of mounting the front seat module, and the back seat module to the frame. In addition, if one or more of the wheel assemblies are not already mounted to the frame and/or a seat module, the method may include a further step 912 of mounting the wheel assemblies to the frame and/or a seat module. In addition, the method may include a step 914 of mounting the handle to the frame and/or the seat modules. This described method may then end at step 916.

It should also be appreciated that this method may be supplemented to accommodate the assembly of a six seat (or larger number of seats) stroller. For example, the previously described method may include a step of providing a second shipping box. Such a second shipping box includes a middle seat module comprised of the plastic material. In addition, the second shipping box may include a frame extension that is operative to mount to the frame that was provided in the first shipping box. As described previously with respect to the first shipping box, this providing step may include the act of shipping the described second shipping box to a customer. This providing step may alternatively, or in addition, include the end user simply acquiring for use this described second shipping box that includes the frame extension and second back seat module.

In addition, this described method may further include removing the frame extension and the middle seat module from the second shipping box. Also, this described method may include mounting the frame extension to the frame. In addition, this described method may include: engaging the projection of the middle seat module with the slot of the front seat module; engaging the projection of the back seat module with the slot of the middle seat module; and mounting each seat module to the frame and/or frame extension.

In an example embodiment, the described stroller assembly may include a brake system for locking one or more wheels that is integrated into the handle. In this regard, referring back to FIG. 4, each rear wheel assembly 416 may include a hub 418 that includes a cylindrical portion 420 that extends into a relatively larger cylindrical portion 422 of the frame 302. The frame 302 may also include handle support members 424 connected to each of the larger cylindrical portions 422 of the frame. Also, the handle 134 may include lower tubular members 408, 410 that extend into and are supported by the handle support members 424 adjacent each rear wheel assembly 416.

As will be described in more detail below, the handle 134 may further include slider knobs 412 connected to each of the lower tubular members 408, 410. These slider knobs 412 are operative to slide relative to the lower tubular members 408, 410 in order to cause plungers inside the tubular members to engage and disengage from the cylindrical portion 420 of the hub 418 of each rear wheel assembly 416.

Figure 10:
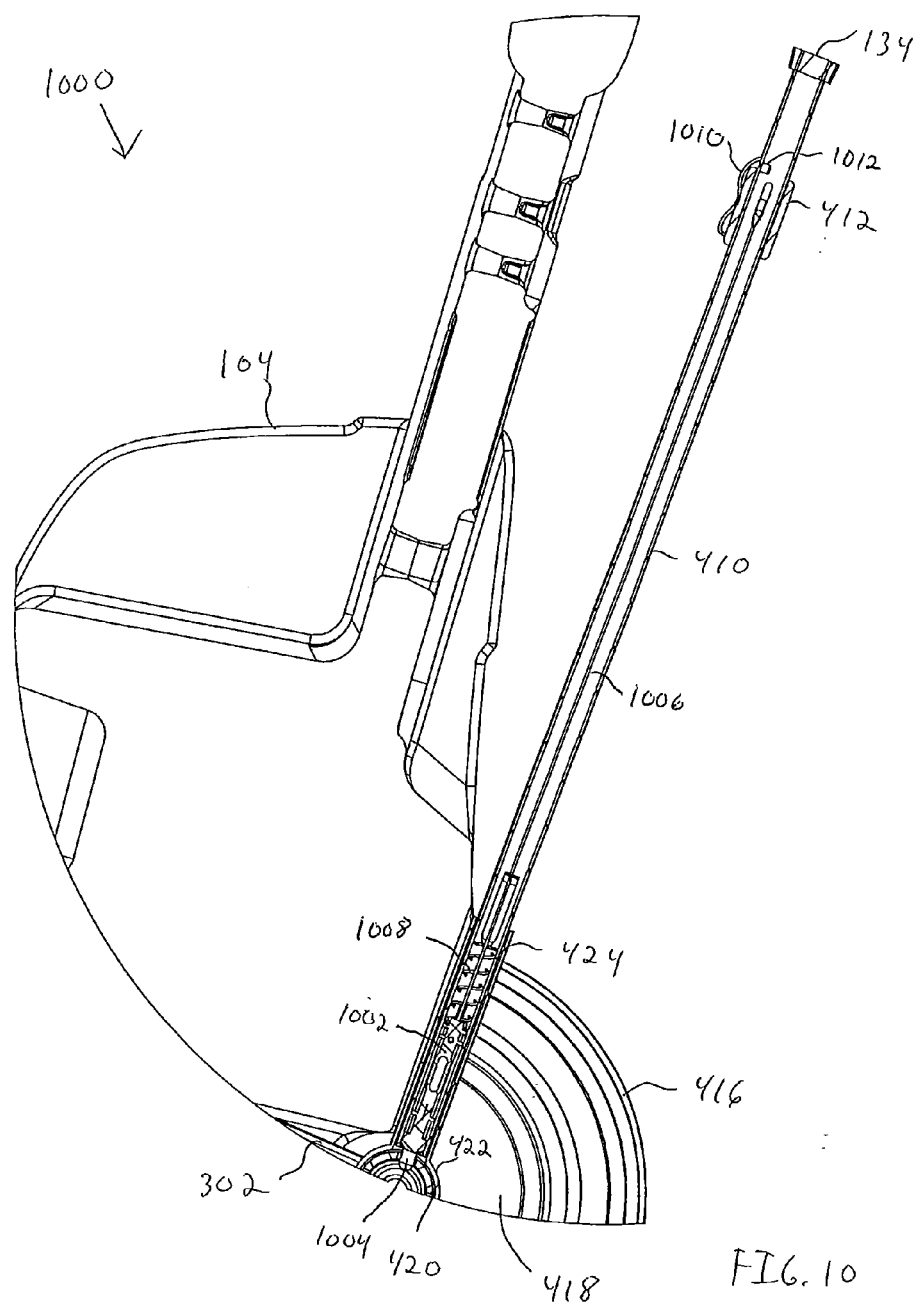
FIG. 10 is a cross-sectional view of an example brake system for a stroller assembly.

To show internal components of this described braking system more clearly, FIG. 10 shows a cross-sectional view 1000 of the frame 302 and handle 134 of the stroller assembly 100. In addition, FIG. 11 shows an isometric view 1100 of the rear wheel assembly 416 without the frame of the stroller assembly.

Referring to FIG. 10, the lower tubular portion 410 of the handle 134 may include a plunger 1002 therein. The plunger may include a lower end that includes a projection 1004. In this example, the plunger is selectively movable by a user of the stroller to move between extended and retracted positions in the lower tubular portion 410 of the handle so as to respectively move the projection 1004 into and out of an aperture in the cylindrical portion 420 of the hub 418.

Figure 11:
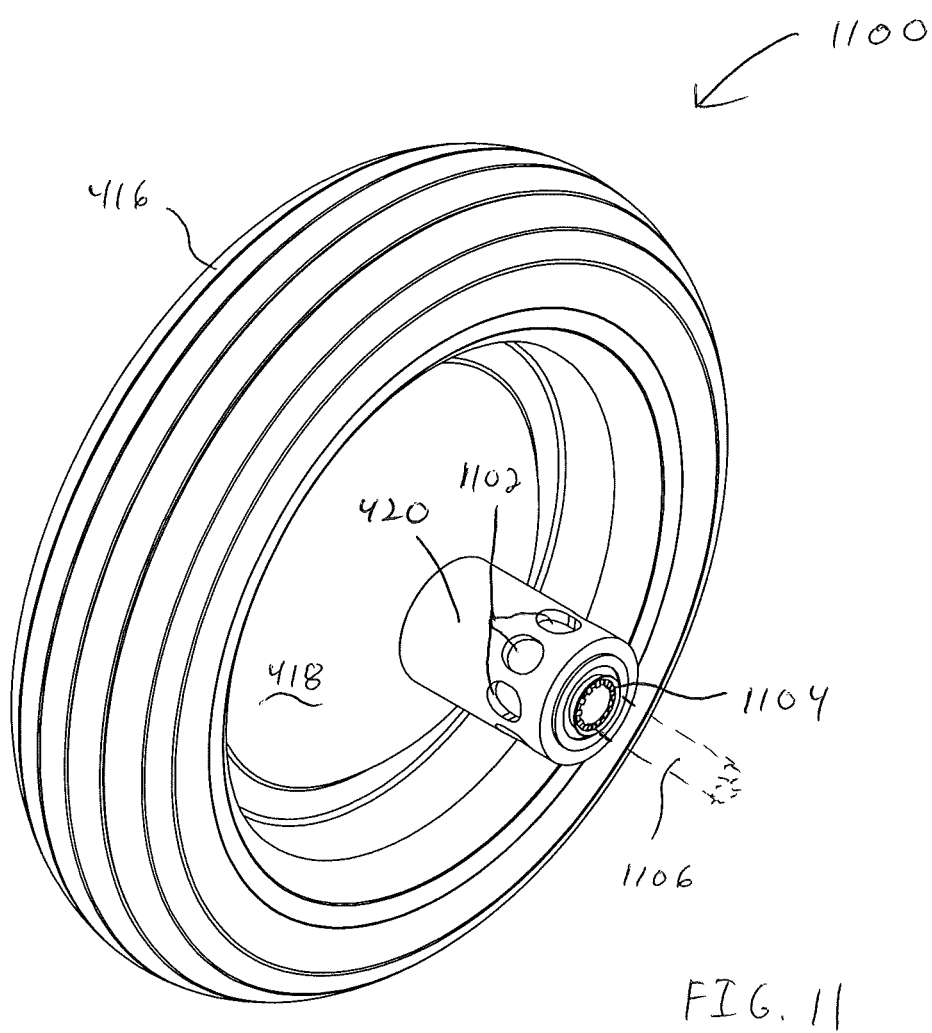
FIG. 11 is an isometric view of an example rear wheel assembly.

As shown in FIG. 11, the cylindrical portion 420 of the hub 418 may include a plurality of annularly positioned apertures 1102 to which the projection 1004 may extend into. Also as shown in FIG. 11, the rear wheel assembly 416 may include roller bearing sets 1104 through which an axle 1106 extends.

Referring back to FIG. 10, it should be appreciated that when the plunger 1002 is in an extended position (as shown in FIG. 10) with the projection 1004 extending into one of the apertures of the hub 420, the wheel assembly 416 becomes locked such that the hub 420 is unable to freely rotate around the axle. Correspondingly, when the plunger 1002 is in a retracted position in which the projection 1004 moves out of an aperture in the hub, the hub 418 of the wheel assembly 416 may be operable to rotate relative to the axle.

In this described example, the slider knob 412 may be in operative connecting with the plunger 1002 via a linkage 1006 (e.g., a cable or rod) that extends between the slider knob 412 and the plunger 1002 inside the lower tubular portion 410 of the handle.

In this example, the brake system may further include a spring 1008 that is operative to bias the plunger 1002 downwardly (to the extended position). As a result, the linkage 1006 pulls the plunger upwardly to unlock the wheel assembly and the spring 1008 is operative to urge the plunger (and linkage) downwardly to lock the wheel assembly. In this example, this described knob may include a movable member 1010 (e.g., a lever) that is operative to selectively prevent and permit sliding of the knob with respect to the lower tubular portion 410, in order to lock the plunger in either the extended (locked) or retracted (unlocked) positions. For example, such a movable member 1010 may include a boss 1012 that engages with one of two spaced apart holes in the lower tubular portion 410.

It should also be appreciated that alternative embodiments of the described stroller assembly may use other forms of brake systems mounted to the wheels, frame, and/or handle in order to lock one or more wheels and prevent the wheels from rotating. For example, rather than having the described plunger system mounted inside the handle 134 of the stroller assembly, an alternative stroller assembly may include an exposed cog mounted to the hubs of the rear wheel assembles and use a handle operated bar/bail or a foot operated lever to engage with the teeth of the cog.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A stroller assembly comprising:
   a frame,
   a plurality of wheels configured to be movably mounted in operative connection with the frame,
   a front seat,
   a back seat,
      wherein the front seat and the back seat each include at least one fastener members integrally formed in fixed connection therewith, wherein the fastener members are operative to engage each other when the front seat and the back seat are mounted in operative connection with the frame.

2. The stroller assembly according to claim 1 wherein the fastener members are blow molded in one piece with their respective front and rear seats.

3. The stroller assembly according to claim 1 wherein the back seat includes at least one side step mounted on a side of the back seat.

4. A method comprising:
   a) providing a first shipping box, wherein the first shipping box includes therein components that can be assembled to produce a stroller assembly, the components including all of the following:
      a frame,
      a plurality of wheel assemblies that are configured to mount to the frame,
      a front seat module,
      a back seat module,
         wherein the front seat module and the back seat module include integrally formed fastener members that are configured when assembled to engage with each other when the front seat module and the back seat module are mounted to the frame such that at least one of the fastener members of one of the front seat module or the back seat module includes a projection that extends toward the other of the front seat module or the back seat module and is operable to engage at least one of the fastener members of the other of the front seat module or the back seat module.

5. The method according to claim 4, wherein in (a):
   each one of the front seat module and the back seat module includes two seats in side-by-side relation,
   wherein the front seat module and the back seat module and the respective integral fastener members are comprised of a plastic material.

6. The method according to claim 5, wherein in (a) the shipping box has a maximum length dimension and a girth dimension, wherein the addition of the maximum length dimension and the girth dimension is equal to or less than 165 inches, wherein the unassembled components including the frame, the wheel assemblies, the front seat module and the back seat module are configured to fit together inside the shipping box, wherein the frame, the wheel assemblies, the front seat module and the back seat module are configured to be assembled together outside the shipping box into the stroller assembly, wherein the stroller assembly accommodates four children seated in the seats of the front seat module and the back seat module.

7. A stroller assembly comprising:
a plurality of wheel assemblies,
a front seat module,
a back seat module,
   wherein each of the wheel assemblies are configured to be in operatively mounted connection with one of the front seat module and back seat module or both,
   wherein the front seat module and the back seat module include fastener members that are operative to engage with each other,
   wherein either:
     a) the fastener member of the back seat module includes a projection that extends forwardly from the back seat module and is operative to engage with the fastener member of the front seat module, or
     b) the fastener member of the front seat module includes a projection that extends rearward from the front seat module and is operative to engage with the fastener member of the back seat module.

8. The stroller assembly according to claim 7, wherein each of the projection of (a) or the projection of (b) is operative to support the feet of children sitting in the seats of the back seat module or standing between the back seat module and the front seat module.

9. The stroller assembly according to claim 8, further comprising a frame, wherein the wheel assemblies are configured to operatively mount to the frame.

10. The stroller assembly according to claim 7 wherein the fastener members are each formed in one piece with their respective front and rear seat modules.

11. A stroller assembly comprising:
a frame,
a plurality of wheel assemblies that are configured to mount to the frame,
a front seat module,
a back seat module,
   wherein each of the front seat module and the back seat module include two seats in side-by-side relation,
   wherein the front seat module and the back seat module include integral fastener members that are configured to engage with each other when the front seat module and the back seat module are mounted to the frame, and wherein the front seat module and the back seat module and the respective integral fastener members are comprised of a plastic material,
a frame extension that is configured to mount to the frame,
a middle seat module comprised of the plastic material, wherein the middle seat module includes two seats in side-by-side relation, wherein the middle seat module includes a plurality of integral fastener members that are configured to engage with the fastener members of both the front seat module and the back seat module when the front seat module, back seat module, and middle seat module are mounted to the frame, the frame extension, or a combination thereof.

12. The stroller according to claim 11, wherein the integral fastener members of the middle seat module includes a projection comprised of the plastic material that extends from the middle seat module and is operative to engage with the front seat module or the back seat module, wherein the projection includes an upper floor surface that is positioned below the seats of the middle seat module.

13. A method comprising:
   a) providing a first shipping box, wherein the first shipping box includes therein unassembled components configured to be assembled to produce a stroller assembly, the components including all of the following:
     a frame,
     a plurality of wheel assemblies that are configured to mount to the frame,
     a front seat module,
     a back seat module,
       wherein the front seat module and the back seat module include integral fastener members that are configured to engage with each other when the front seat module and the back seat module are mounted to the frame,
     and, wherein either:
       (i) the integral fastener member of the back seat module includes a projection that extends forwardly from the back seat module when the stroller is assembled and is operative to engage with the fastener member of the front seat module, wherein the projection includes an upper floor surface that is positioned below the seats of the back seat module and the projection is configured to support the feet of children sitting in the seats of the back seat module or standing between the back seat module and the front seat module, or
       (ii) the integral fastener member of the front seat module includes a projection that extends rearward from the front seat module when the stroller is assembled and is configured to engage with the fastener member of the back seat module, wherein when engaged with the fastener member of the back seat module, the projection includes an upper floor surface that is positioned below the seats of the back seat module, wherein the projection is configured to support the feet of children sitting in the seats of the back seat module or standing between the back seat module and the front seat module.

14. The method according to claim 13, further comprising:
   b) removing the frame, the front seat module and the back seat module from the shipping box;
   c) engaging the projection of one of the front seat module or back seat module with the fastener member of the other of the back seat module or the front seat module; and
   d) mounting the front seat module and the back seat module to the frame.

15. The method according to claim 13, wherein in (a):
each one of the front seat module and the back seat module includes two seats in side-by-side relation,
wherein the front seat module and the back seat module and the respective integral fastener members are comprised of a plastic material,
wherein the shipping box corresponds to a first shipping box, and further comprising:
   providing a second shipping box, wherein the second shipping box houses components including a middle seat module comprised of the plastic material, wherein the middle seat module includes two seats in side-byside relation, wherein the middle seat module includes a plurality of integral fastener members that are configured to engage with the fastener members of both the front seat module and the back seat module when the front seat module, back seat module, and middle seat module are mounted to the frame, the frame extension, or a combination thereof.

16. The method according to claim 15, wherein in (b) the integral fastener member of the middle seat module includes a projection comprised of the plastic material that extends from the middle seat module and is configured to engage with the front seat module or the back seat module, wherein the projection includes an upper floor surface that in an assembled condition is positioned below the seats of the middle seat module.

17. The method according to claim 16, further comprising:
b) removing the frame, the front seat module and the back seat module from the first shipping box;
c) removing the frame extension and the second back seat module from the second shipping box;
d) mounting the frame extension to the frame;
e) engaging the projection of one of the front seat module or back seat module with the fastener member of the other of the back seat module or the front seat module;
f) engaging the projection of the second back seat module with the back seat module; and
g) mounting the front seat module, the back seat module, and the second back seat module to the frame and frame extension.

18. The method according to claim 13, wherein in (a):
each one of the front seat module and the back seat module includes two seats in side-by-side relation,
wherein the front seat module and the back seat module and the respective integral fastener members are comprised of a plastic material.

19. A stroller assembly comprising:
a frame,
a plurality of wheel assemblies that are configured to mount to the frame,
a front seat module,
a back seat module,
wherein the front seat module and the back seat module include integral fastener members that are configured to engage with each other when the front seat module and the back seat module are in mounted connection with the frame,
and, wherein either:
the integral fastener member of the back seat module includes a projection that extends forwardly from the back seat module and is configured to engage with the fastener member of the front seat module, or
the integral fastener member of the front seat module includes a projection that extends rearward from the front seat module and is configured to engage with the fastener member of the back seat module.

20. The stroller assembly according to claim 19, wherein each one of the front seat module and the back seat module include two seats in side-by-side relation, wherein the front seat module and the back seat module and the respective integral fastener members are comprised of a plastic material.

21. The stroller assembly according to claim 20 comprising:
a single shipping box having a maximum length dimension and a girth dimension, wherein the addition of the maximum length dimension and the girth dimension is equal to or less than 165 inches, wherein the frame, the wheel assemblies, the front seat module and the back seat module are configured to fit together inside the shipping box prior to assembly, wherein the frame, the wheel assemblies, the front seat module and the back seat module are operative to be assembled together outside the shipping box into a stroller that accommodates four children seated in the seats of the front seat module and the back seat module.

22. The stroller according to claim 20, further comprising a brake system and a push handle that is configured to fasten to the back seat module, the frame, at least one of the wheel assemblies, or a combination thereof, wherein the brake system includes at least one plunger that extends inside a portion of the handle, wherein at least one wheel assembly of the plurality of wheel assemblies includes a hub having a cylindrical portion that includes a plurality of annular apertures, wherein the frame includes a cylindrical portion in which the cylindrical portion of the hub extends therein, wherein the plunger is operative to be selectively moved inside the handle to extend into and out of one of the plurality of apertures in the cylindrical portion of the hub so as to respectively lock and unlock rotation of the at least one wheel assembly.

23. The stroller according to claim 20, further comprising a push handle that is configured to fasten to the back seat module, the frame, at least one of the wheel assemblies, or a combination thereof.

24. The stroller according to claim 20, further comprising a roof assembly that is configured to fasten to the front seat module, the back seat module, the frame, at least one of the wheel assemblies, or a combination thereof.

25. The stroller according to claim 20, wherein the back seat module is engaged to the front seat module and both the front seat module and the back seat module are mounted to the frame, wherein the wheel assemblies are mounted to the frame.

26. The stroller assembly according to claim 19, wherein either
the projection that extends forwardly from the back seat module and is configured to engage with the fastener member of the front seat module includes an upper floor surface that is positioned below the seats of the back seat module, wherein the projection is configured to support the feet of at least one child sitting in at least one seat of the back seat module or standing between the back seat module and the front seat module, or
the projection that extends rearward from the front seat module and is configured to engage with the fastener member of the back seat module includes an upper floor surface that is positioned below the seats of the back seat module, wherein the projection is operative to support the feet of at least one child sitting in at least one of the back seat module or standing between the back seat module and the front seat module.

27. The stroller assembly according to claim 26, wherein each one of the front seat module and the back seat module include two seats in side-by-side relation, wherein the front seat module and the back seat module and the respective integral fastener members are comprised of a plastic material.

28. A stroller comprising:
a frame,
a plurality of wheels, wherein each of the wheels is movably mounted in operative connection with the frame, a front seat, wherein the front seat is in operative connection with the frame, a back seat, wherein the back seat is positioned behind the front seat and is in operative connection with the frame, at least one fastener projection, wherein the at least one fastener projection is in fixed connected relation with one of the front seat and the back seat, and wherein the at least one fastener projection extends toward the other of the front seat or the back seat and is releasably engaged in at least one inter-engaging recess in operatively fixed connection with the other of the front seat and the back seat when the front seat and the back seat are in operative connection with the frame.

29. The stroller according to claim 28, and further comprising:

a floor, wherein the floor extends between the front seat and the back seat, wherein the floor is in fixed connected relation with one of the front seat and the back seat, wherein the floor includes the at least one fastener projection.

* * * * *